July 29, 1969  S. G. BEST  3,458,682
MAGNETIC SHIELD FOR WORKING WITH A BEAM OF CHARGED PARTICLES
Filed Dec. 28, 1966
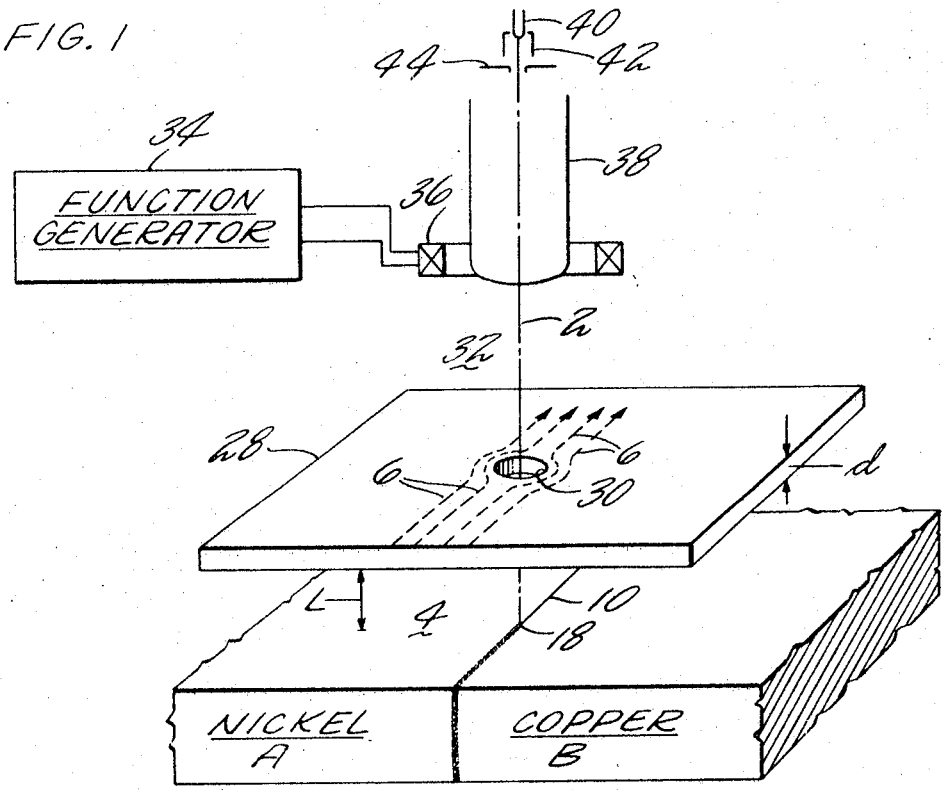
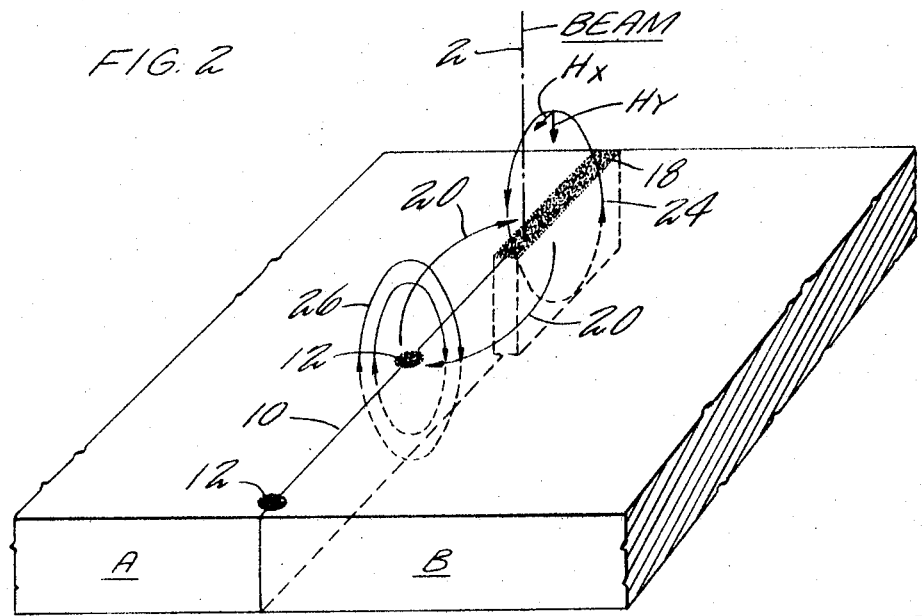
INVENTOR
Stanley G. Best
BY Louis H. Reens
ATTORNEY United States Patent Office 3,458,682
Patented July 29, 1969

1

3,458,682
MAGNETIC SHIELD FOR WORKING WITH A
BEAM OF CHARGED PARTICLES
Stanley G. Best, Manchester, Conn., assignor to United
Aircraft Corporation, East Hartford, Conn., a corporation of Delaware
Filed Dec. 28, 1966, Ser. No. 605,484
Int. Cl. B23k 9/00
U.S. Cl. 219—121                                    15 Claims

ABSTRACT OF THE DISCLOSURE

A magnetic shield is interposed between the workpieces to be welded and the source of the electron beam and provided with a small aperture for passing the electron beam whereby the deflection effects of stray magnetic fields near the workpieces are reduced to negligible levels.

BACKGROUND

In the field of welding with beam of charged particles, problems are encountered as a result of deflections of the beam by stray magnetic fields. Such stray fields may arise from various sources. For example, the workpiece itself may contain a certain degree of residual magnetism or the parts of the beam machine may become magnetized to some undesirable degree, or stray fields may exist within the work area as a result of thermoelectric currents caused by temperature gradients existing when one is welding thermoelectrically dissimilar metals. The situation may be severely aggravated when one of the materials to be welded is magnetic.

Previously, where one attempted to electron beam seam weld for instance nickel to copper a large deflection of the beam would occur external to the workpiece. This stray deflection occurs in a plane transverse to the weld seam causing a random wandering of the beam from one side of the seam to the other. Stray surface deflections of 0.125 inch to one side of the seam have been encountered in nickel to copper welds. These uncontrolled deflections are completely unacceptable and render seam welds of such dissimilar materials extremely difficult to make.

Similar stray deflection problems are encountered inside the workpieces when one seeks to electron beam weld thick workpieces according to the deep penetrating beam welding method taught by U.S. Patent 2,987,610.

One explanation of this stray deflection problem proposes that the magnetic deflecting field is the result of a thermoelectrically induced current flowing between the dissimilar workpieces. A thermocouple circuit results as the seam welding takes place. The hot junction is in the immediate area of the beam impingement while the rest of the seam which is at various temperature levels acts as the cold junction. Although the electrical circuit is very complex and difficult to analyze a simplified example is illustrated in FIG. 2.

In FIG. 2 copper and nickel square butt electron beam welds are to be made. Prior to welding with the beam the pieces are tack welded together at intervals as illustrated in FIG. 2. These tacked joints 12 represent cold junctions for thermoelectric circuits. When one thereafter performs a beam weld of the complete seam, a hot junction is formed causing a path of heavy current 20 to flow as indicated in FIG. 2. Resulting magnetic flux lines 24 and 26 appear to be as illustrated extending above and within the workpieces and form complete loops threading the current path loop 20. Adjacent the electron beam there is a magnetic field component $Hy$ in a vertical direction parallel to the axis of the electron beam, and a component $Hx$ in a horizontal direction along the length of the seam. The $Hx$ component deflects the electron beam laterally across the seam causing a random wandering, making seam following extremely difficult. As a result, the proper electron beam control during the seam welding of certain dissimilar materials is extremely difficult.

SUMMARY

It is therefore an object of this invention to provide an apparatus and a method for working materials with a beam of charged particles in the vicinity of a stray magnetic field.

It is a further object of this invention to provide a method and apparatus for seam welding dissimilar metals with a beam of charged particles by reducing the effect of stray magnetic fields emanating from the workpieces.

These objects and others are obtained as shown in a preferred embodiment in the drawings and the following description.

FIG. 1 illustrates an embodiment of this invention.
FIG. 2 illustrates the thermoelectric explanation.

In the preferred embodiment, a magnetic shield plate of high permeability and having an optional aperture is positioned between the electron beam source and the desired working zone on the workpiece. The plate is placed as close to the workpiece as is practical, to provide a low reluctance return path for the magnetic fields in the vicinity of the workpiece. The flux lines of the stray fields pass into the plate and around the aperture and are effectively diverted from the region above the plate and near the beam. The beam passes through the plate onto the workpieces without appreciable stray deflection.

Further improvement may be obtained to eliminate internal stray deflection by moving the beam in an oscillatory or harmonic manner normal to the seam where a seam weld is to be made.

DESCRIPTION

In FIG. 1 two pieces of dissimilar materials such as copper and nickel are welded along a seam 10. A magnetic shield 28 having an aperture 30 is placed at a distance L from the workpieces A and B and the seam 10. The shield is made of a high permeability material such as iron and must have a sufficiently large area to shield the region 32, above the plate, from the stray magnetic fields emanating from the parts A and B being welded.

A beam of high energy electrons is generated in a highly evacuated chamber 38 from a cathode 40. A control electrode 42 controls the intensity and the electrons are accelerated towards an anode 44. The electron beam generating apparatus may be such as is described in U.S. Patent 2,987,610. A deflection mechanism 36 is also provided to enable one to modulate the displacement of the beam. The signal for such modulation is obtained from a function generator 34. In the case where a circle modulation is required, two deflection coils placed at 90° of one another are driven by sine and cosine function generators. Where linear deflection is desired a ramp function generator is used to drive the deflection coil 36.

Electron beam deflection is a function of the distance in which the stray magnetic field acts upon the beam. A reduction of the region 4 below the plate is obtained by placing the iron magnetic shield 28 at a close distance L from the workpieces. Little or no stray deflection can then occur.

The aperture 30 is made as small as possible and is given such dimensions that the stray magnetic field will not penetrate through it into the region 32. The aperture may be even made by the penetrating electron beam itself. By keeping the aperture small the flux lines 6 in the plate 28 will bend around it and follow the lower reluctance path inside the iron plate to retain a magnetic field free aperture 30. The aperture may have special shapes such as a thin slot to accommodate deflection modulations from coil 36. The shape and size of the aperture 30 depends upon the application and degree of shielding required. The distance L should be as small as possible but on the other hand not so close that the heat generated at the weld will warp the shield 28.

Thus a copper to steel seam weld was made without stray deflection by employing a magnetic shield of iron. The iron shield had surface dimensions of 6 inches wide by 6 inches long, a thickness $d$ of ½ inch and an opening 30 of ¼-inch diameter. The shield was placed ¼ inch from the copper and steel workpieces.

The magnetic shield 28 is attached to the electron beam mechanism so that the seam 10 moves relative to the plate 28. In other cases where one wishes to take advantage of the penetrating characteristic of the beam the plate 28 may be fixed to the materials A and B and then the beam moves relative to the plate 28, whereby the beam makes its own aperture 30 which closes as a simulated weld behind the beam or penetrates through a narrow slot parallel to the seam 10. In either case, the plate is properly grounded to avoid undesirable buildup of charges.

In seam welding some materials such as copper and nickel an internal stray deflection arises as the beam penetrates into the materials along the seam. Oscillatory deflection of the beam normal to the seam at a 60 cycle frequency along with the previously described magnetic shield eliminated this internal stray deflection. Consequently by practicing my invention one may now electron beam weld dissimilar materials with precision and without stray deflections of the beam. Copper to nickel seam welds of materials of one inch thickness were accomplished with the beam impinging and penetrating along the desired fusion zones.

It is to be understood that the invention is not limited to the specific embodiments herein illustrated and described but may be used in other ways without departure from its spirit as defined by the following claims.

I claim:

1. A method of eliminating stray beam deflections from magnetic fields emanating from the material being worked by a beam of charged particles comprising:
    placing the desired working zone of the material generally in the path of the beam of charged particles,
    placing a magnetically permeable shield at a position between the material and the source of the beam of charged particles, and within the magnetic fields emanating from the material when the material is worked by the beam, and
    directing the beam of charged particles through the magnetic shield and onto the desired working zone to perform work with the beam on the material.

2. The method as recited in claim 1 wherein the magnetic shield remains stationary relative to the beam of charged particles.

3. The method as recited in claim 1 wherein the magnetic shield remains stationary relative to the material.

4. A method for eliminating stray beam deflections arising from magnetic fields emanating from the dissimilar materials being welded by an electron beam comprising:
    placing the desired welding zone of the dissimilar materials generally in the path of the electron welding beam,
    placing a magnetically permeable shield at a position between the materials and the source of the electron beam, and within the magnetic fields emanating from the materials when the materials are worked by the beam, and
    directing the beam through the magnetic shield and onto the desired welding zone for welding the dissimilar materials.

5. A method for eliminating stray beam deflections arising from magnetic fields emanating from the seam fusion welding of dissimilar materials with an electron beam comprising:
    placing the seam zone between the dissimilar materials generally in the path of the electron welding beam,
    placing a magnetically permeable shield adjacent the seam at a position between the materials and the source of the electron beam, and within the magnetic fields emanating from the materials when the materials are worked by the beam, and
    directing the beam through the magnetic shield and onto the desired seam zone for fusion welding the dissimilar materials throughout the entire desired seam zone.

6. A method as recited in claim 5 wherein one of the dissimilar materials is copper and the other a different metal.

7. A method as recited in claim 5 wherein one of the dissimilar materials is nickel and the other a different metal.

8. A method as recited in claim 5 and further comprising:
    moving the beam in a oscillatory manner transverse to the seam to eliminate internal stray deflections.

9. A method as recited in claim 8 wherein one of the materials is copper and the other is nickel.

10. Apparatus for eliminating the stray beam deflections arising from magnetic fields emanating from a workpiece being worked by a beam of charged particles generated, focused and directed at the desired work zone of the workpiece, the improvement comprising:
    a low reluctance magnetic shield plate positioned adjacent the work zone between the workpiece and the source of the beam of charged particles, and within the magnetic fields emanating from the workpiece when the workpiece is worked by the beam, and
    said beam of charged particles being directed through said magnetic shield plate onto the workpiece.

11. A device as recited in claim 10 wherein the magnetic shield plate is provided with an aperture and the plate is positioned with the aperture between the desired work zone and the beam,
    said aperture being so dimensioned as to effect magnetic shielding of the beam in the region above the plate.

12. A device as recited in claim 10 wherein the magnetic shield plate has a fixed position relative to the beam of charged particles.

13. A device as recited in claim 10 wherein the magnetic shield plate has a fixed position relative to the workpiece.

14. A device as recited in claim 11 wherein the magnetic shield plate is positioned a distance of the order of one quarter of an inch from the workpiece.

15. A device as recited in claim 14 wherein the magnetic shield plate has a thickness of the order of one-half an inch and the aperture cross-sectional dimension is of the order of a quarter of an inch.

References Cited

UNITED STATES PATENTS 2,475,183   7/1949   Gibson _____ 219—123

OTHER REFERENCES

German printed application; 1,199,416; Hanau, Aug. 26, 1965.

JOSEPH V. TRUHE, Primary Examiner

W. DEXTER BROOKS, Assistant Examiner